United States Patent [19]
Broyhill et al.

[11] Patent Number: 4,588,128
[45] Date of Patent: May 13, 1986

[54] FOLDING BOOM FOR AGRICULTURAL SPRAYERS

[75] Inventors: Roy F. Broyhill; Craig G. Broyhill, both of Dakota City, Nebr.

[73] Assignee: The Broyhill Company, Dakota City, Nebr.

[21] Appl. No.: 704,864

[22] Filed: Feb. 25, 1985

[51] Int. Cl.$^4$ .................................................. B05B 1/20
[52] U.S. Cl. ...................................................... 239/168
[58] Field of Search ............... 239/163, 166, 167, 168, 239/169, 172; 52/113, 114; 280/411 A, 411 R

[56] References Cited

U.S. PATENT DOCUMENTS

| | | | |
|---|---|---|---|
| 3,055,594 | 9/1962 | Nansel | 239/167 X |
| 3,395,503 | 8/1968 | Greenburg et al. | 239/166 X |
| 3,716,212 | 2/1973 | Fox | 239/167 X |
| 4,344,572 | 8/1982 | Tyler | 239/168 |
| 4,409,780 | 10/1983 | Beougher et al. | 280/411 A |
| 4,427,154 | 1/1984 | Mercil | 239/161 |
| 4,441,655 | 4/1984 | Blumhardt | 239/163 |

FOREIGN PATENT DOCUMENTS

| | | | |
|---|---|---|---|
| 2298264 | 9/1976 | France | 239/167 |
| 587484 | 4/1947 | United Kingdom | 239/167 |
| 204828 | 9/1966 | U.S.S.R. | 239/168 |

*Primary Examiner*—Joseph F. Peters, Jr.
*Assistant Examiner*—David P. Davidson
*Attorney, Agent, or Firm*—Zarley, McKee, Thomte, Voorhees & Sease

[57] ABSTRACT

A folding boom for agricultural sprayers comprising a center frame section mounted in the bed of a truck on a trailer. First and second boom assemblies normally extend outwardly from the center section with each of the first and second boom assemblies comprising inner, intermediate and outer boom sections. The inner boom section is connected to the center frame section so that the inner boom section will pivotally move rearwardly if the inner boom section strikes an obstruction. The inner boom section is also connected to the center frame section in such a manner so that the inner boom section may be freely pivotally moved to a transport position. The intermediate boom section is pivotally connected to the outer end of the inner boom section so that the intermediate boom section may pivot rearwardly relative to the inner boom section if the outer or intermediate boom sections strike an obstruction. The outer boom section is pivotally connected, about a horizontal axis, to the outer end of the intermediate boom section so that the outer end of the outer boom section is pivotally moved upwardly if either the intermediate or outer boom sections strike an obstruction. The outer end of the outer boom section is also pivotally moved upwardly if the inner boom section moves downwardly relative to the center frame section. The outer boom section may be folded upwardly over the intermediate section for transport purposes and the intermediate boom section may be folded rearwardly relative to the inner boom section for transport purposes.

5 Claims, 9 Drawing Figures

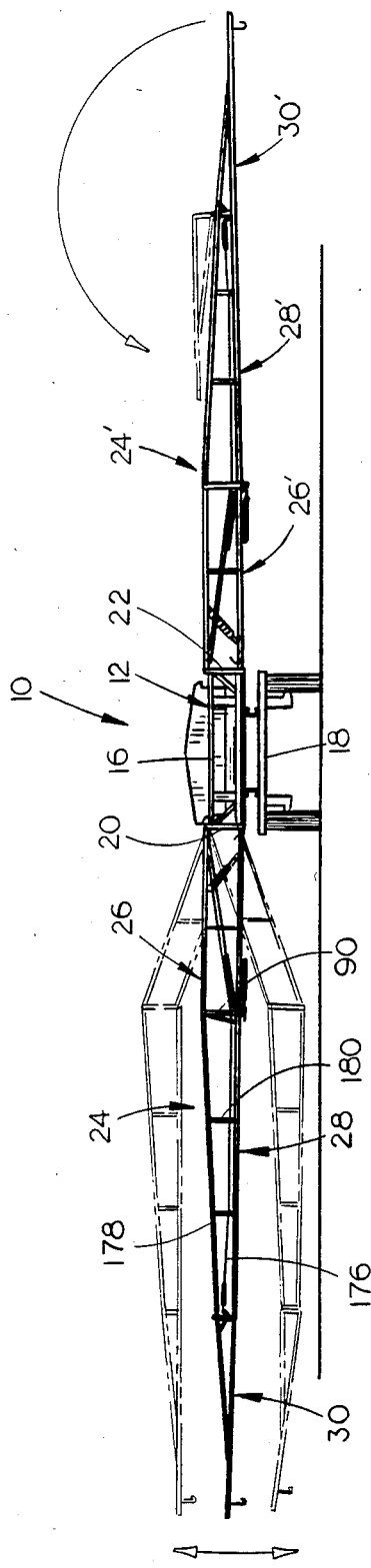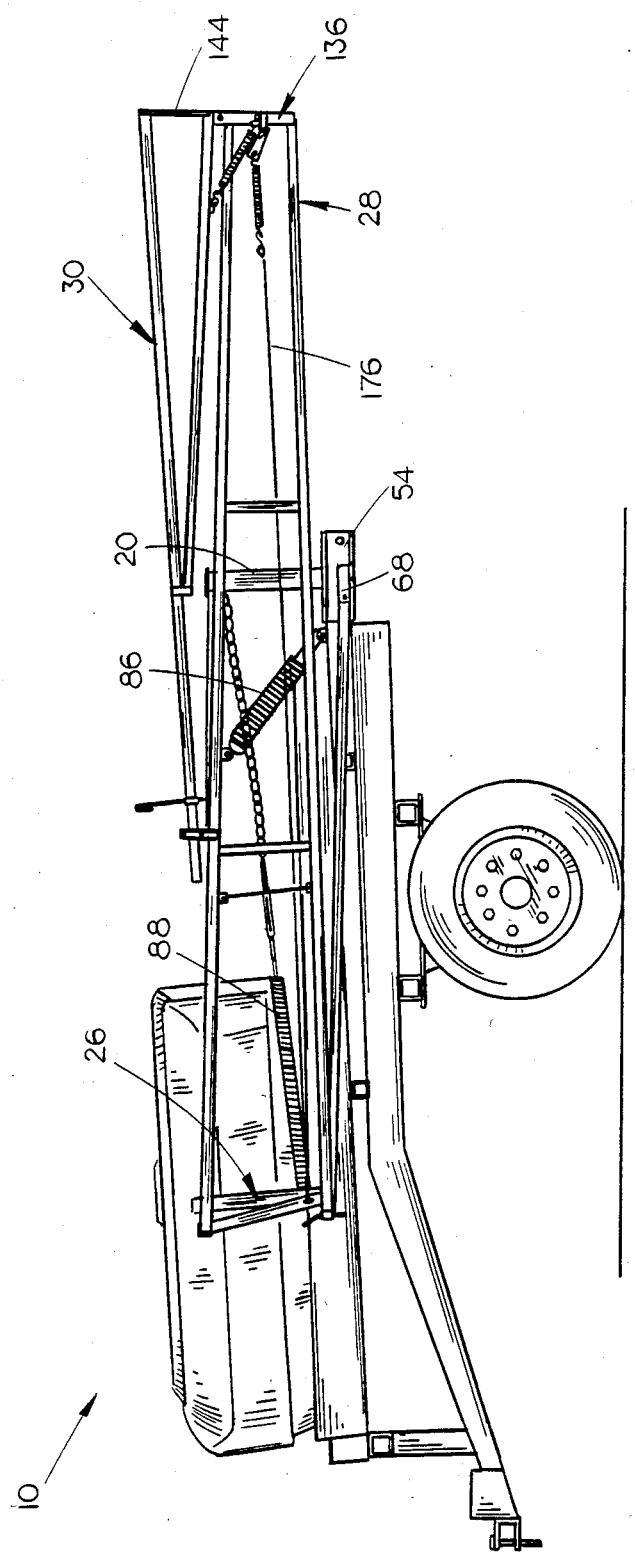

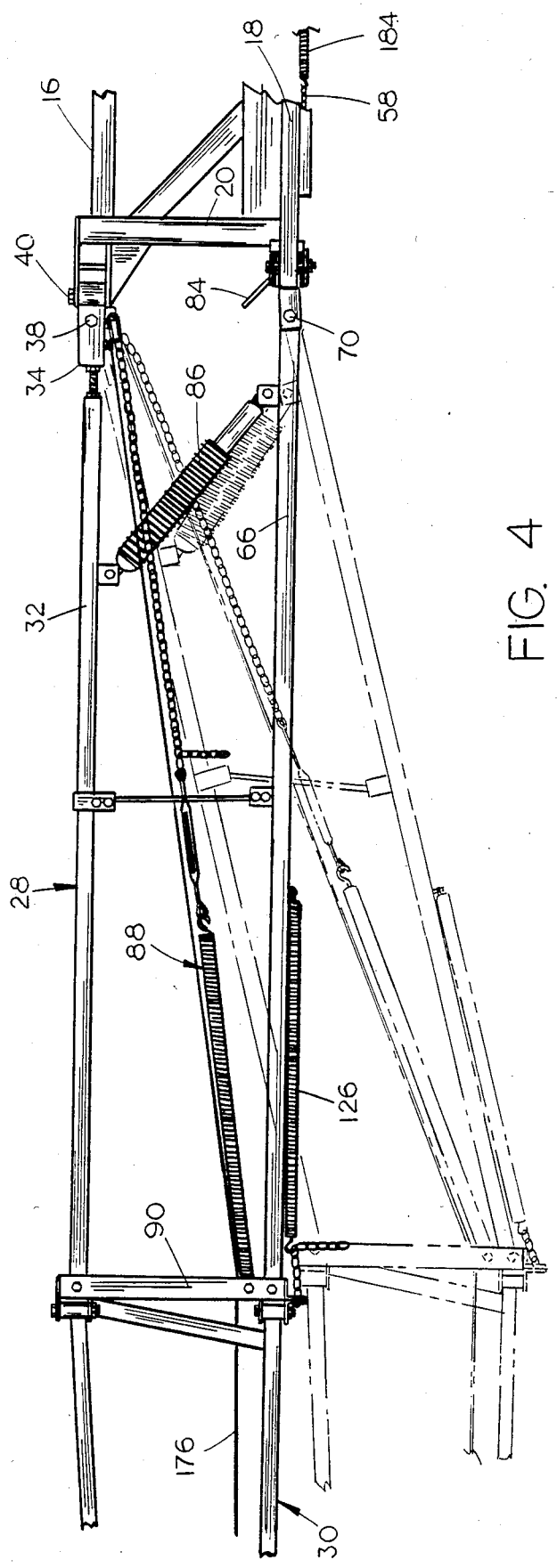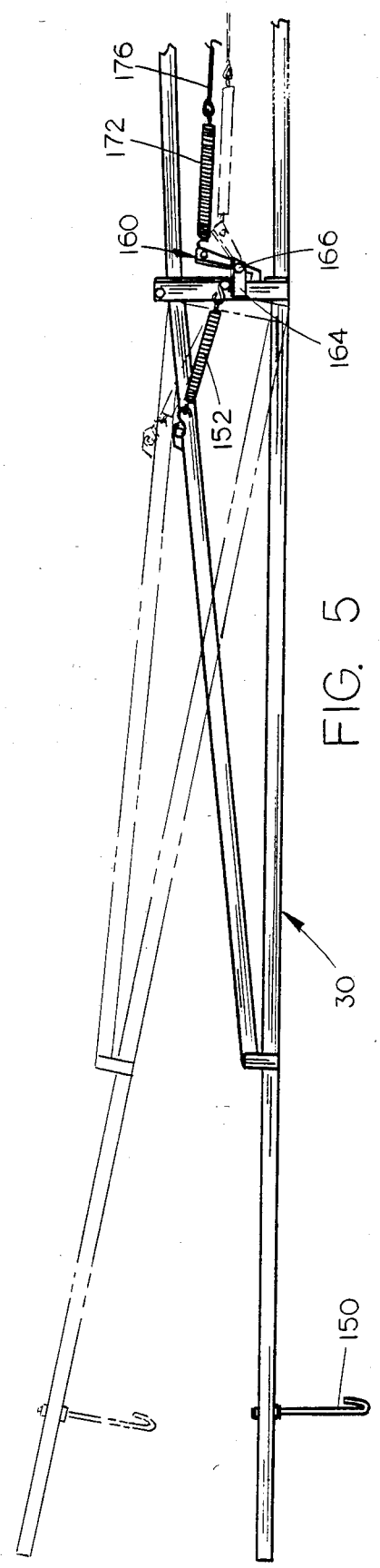

FOLDING BOOM FOR AGRICULTURAL SPRAYERS

BACKGROUND OF THE INVENTION

This invention relates to a folding boom for use with agricultural sprayers which may be mounted on either trucks or trailers.

Agricultural sprayers are normally mounted on tractors, trucks or trailers and usually include boom assemblies which extend laterally from opposite sides of the truck or trailer. In the conventional sprayers, a boom assembly normally extends laterally from each side of the truck or trailer and generally comprises at least inner and outer boom sections pivotally secured together so that the boom sections may be folded to a transport position and so that the boom sections will "break away" if one of the boom sections encounters an obstruction or the like. A typical type of such a sprayer is disclosed in U.S. Pat. No. 4,441,655. The instant invention has been provided to provide a more efficient folding, centering and reliable structure than that disclosed in U.S. Pat. No. 4,441,655.

SUMMARY OF THE INVENTION

The sprayer of this invention comprises a center frame section which may be mounted on either a truck or trailer. First and second boom assemblies are mounted at the opposite ends of the center frame section and normally extend outwardly therefrom transversely to the direction of travel of the sprayer. Each of the first and second boom assemblies comprises inner, intermediate and outer boom sections. The inner boom section is pivotally secured to the center frame section in such a manner so that the inner boom section will pivotally move rearwardly should an obstruction be encountered and so that the inner boom section may be selectively pivotally moved forwardly to a transport position. The intermediate boom section is pivotally secured to the outer end of the inner boom section to enable the intermediate boom section to move rearwardly with respect to the inner boom section should an obstruction be encountered. The intermediate boom section may be also folded relative to the inner boom section for transport purposes. The outer boom section is pivotally secured about a horizontal axis to the outer end of the intermediate section and has a spring means associated therewith which normally maintains the outer boom section generally horizontal to the ground and parallel to the intermediate boom section. A cable extends from the inner end of the inner boom section outwardly to the connection between the intermediate and outer boom sections and is designed to raise the outer end of the outer boom section if either the inner or intermediate boom sections pivotally move rearwardly upon encountering an obstruction or if the inner or intermediate boom sections are moved downwardly relative to the center frame section.

A principal object of the invention is to provide an improved agricultural sprayer including a boom assembly and wherein the outer end of the boom assembly is moved upwardly if the boom assembly encounters an obstruction or the like or if the boom assembly moves downwardly relative to the center frame section.

A further object of the invention is to provide an improved agricultural sprayer which maintains the boom assembly thereof in a proper working position during the times that the sprayer is being moved over uneven terrain at relatively high speeds.

Still another object of the invention is to provide an agricultural sprayer including improved break-away and centering features.

Still another object of the invention is to provide an improved agricultural sprayer which is durable in use and refined in appearance.

These and other objects will be apparent to those skilled in the art.

BRIEF DESCRIPTION OF THE DRAWINGS

FIG. 2 is a rear view of the sprayer with the broken lines indicating various positions of the boom assemblies:

FIG. 3 is a side view of the sprayer illustrating the booms in the transport position:

FIG. 4 is a partial rear view of one of the boom assemblies with the broken lines indicating the manner in which the inner boom section may move downwardly relative to the center frame section:

FIG. 5 is a partial rear view of the outer portion of the boom assembly of FIG. 4 and illustrating the outer boom section being pivotally moved upwardly:

FIG. 7 is an exploded perspective view illustrating the connection between the outer end of the inner boom section and the inner end of the intermediate boom section:

DESCRIPTION OF THE PREFERRED EMBODIMENT

Figure 1:
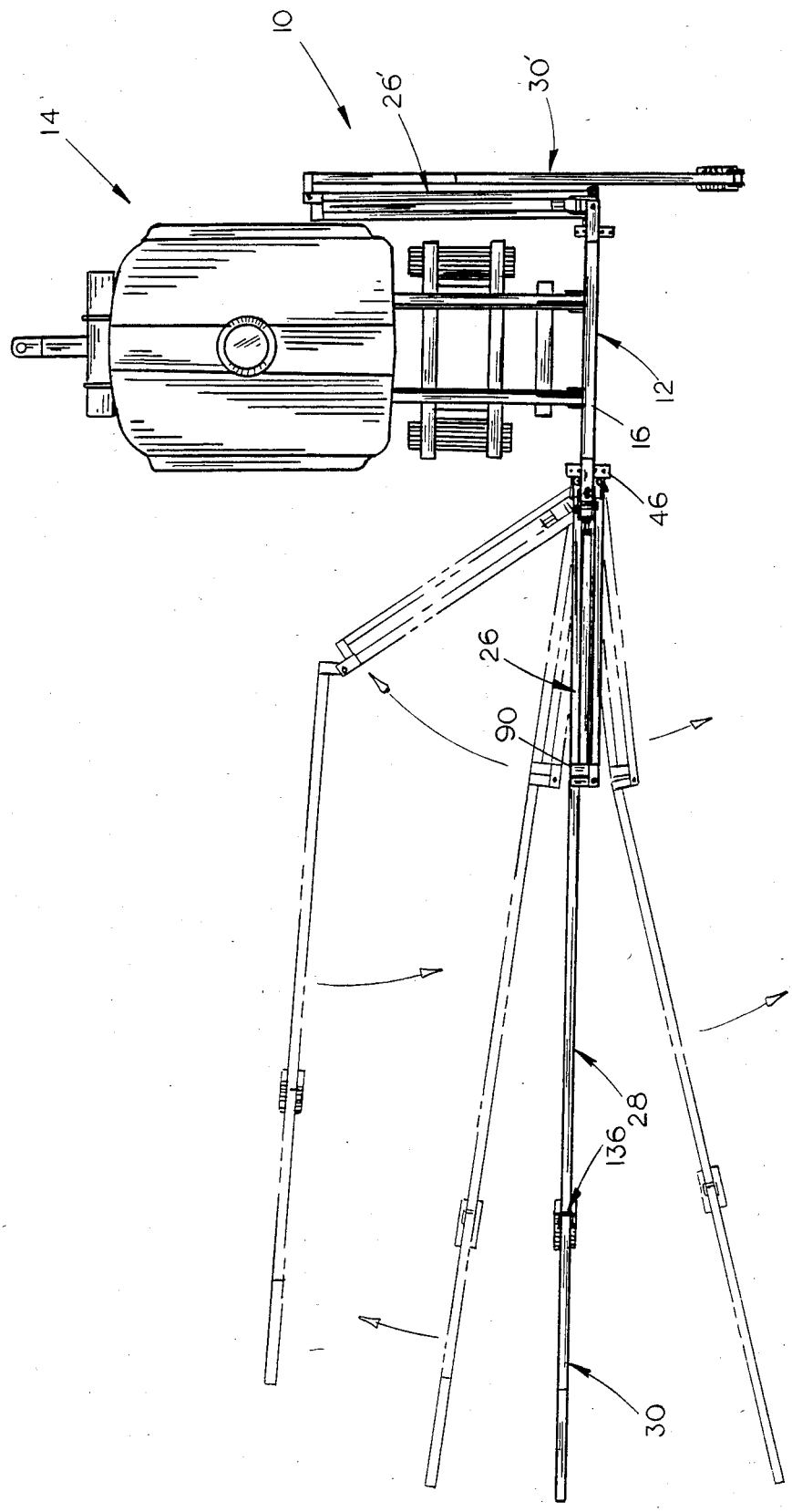
FIG. 1 is a top view of the sprayer of this invention illustrating one of the booms being positioned in the transport position with the other boom being illustrated in various positions.

The sprayer of this invention is referred to generally by the reference numeral 10 and includes a center frame section 12 which is adapted to be mounted in either the bed of a truck or mounted on a trailer which is referred to generally by the reference numeral 14.

Center frame section 12 includes upper and lower frame members 16 and 18 having vertically disposed posts 20 and 22 at the opposite ends thereof. Boom assemblies 24 and 24' are mounted at the opposite ends of the center frame section 12 and generally comprise inner, intermediate and outer boom sections 26, 28, 30 and 26', 28' and 30', respectively. Inasmuch as each of the boom assemblies 24 and 24' are identical, only boom section 24 will be described in detail with "'" indicating identical structure on boom assembly 24'.

Figure 6:
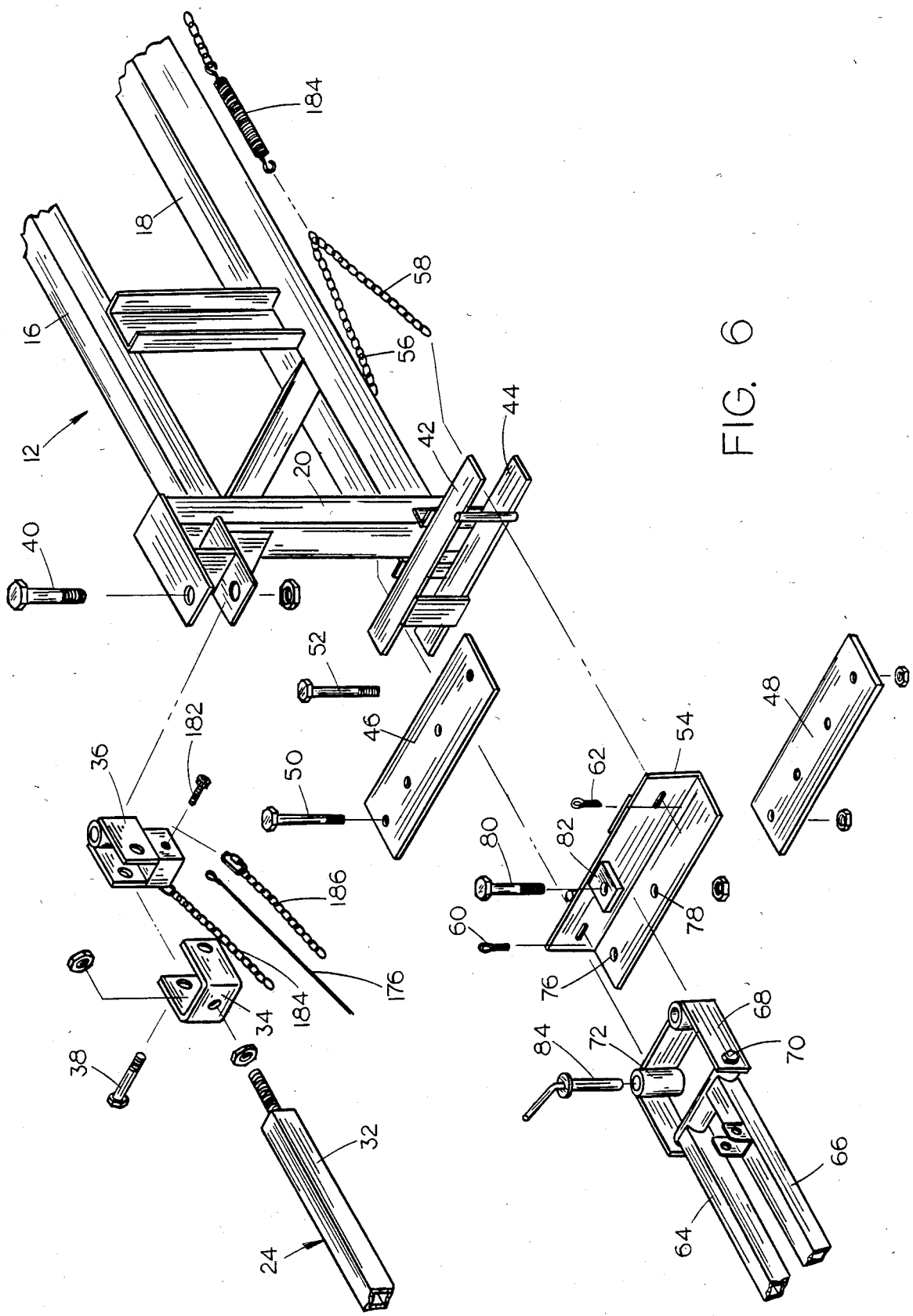
FIG. 6 is an exploded perspective view of the connection between the inner boom section of one of the boom assemblies and the center frame section.
Figure 8:
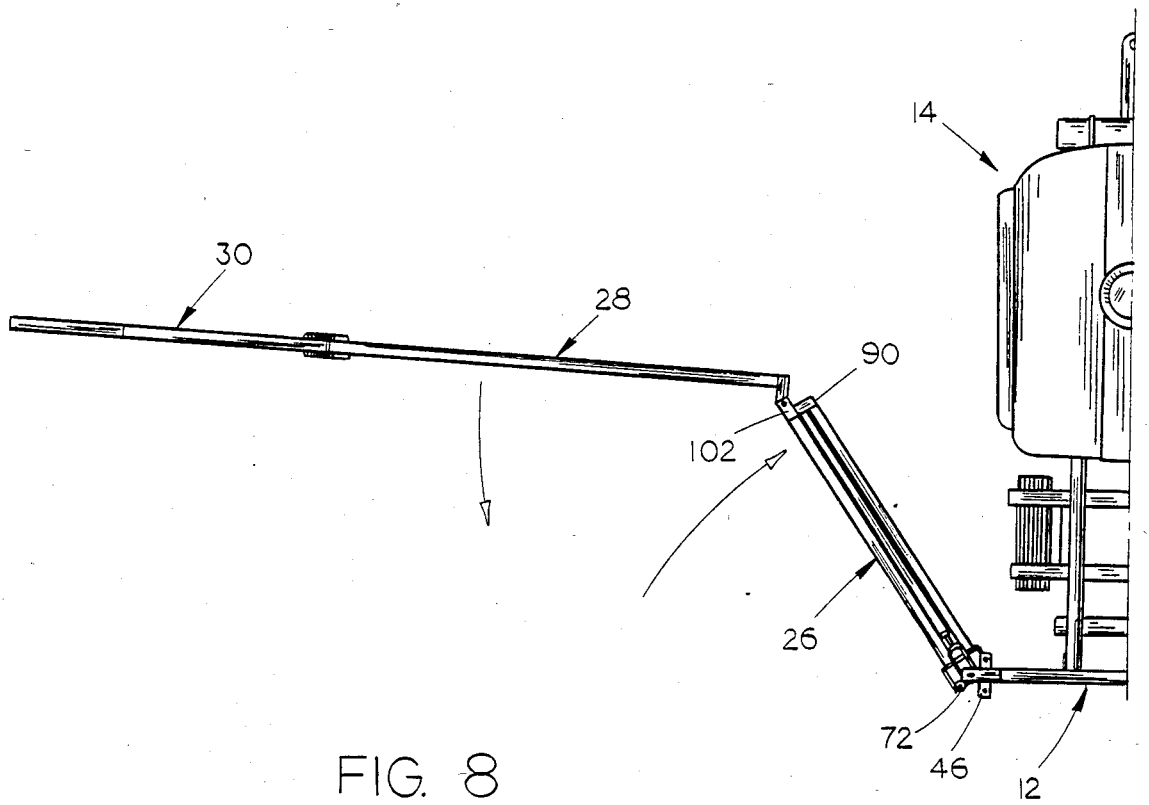
FIG. 8 is a partial top view illustrating one of the boom assemblies being pivotally moved to the transport position.
Figure 9:
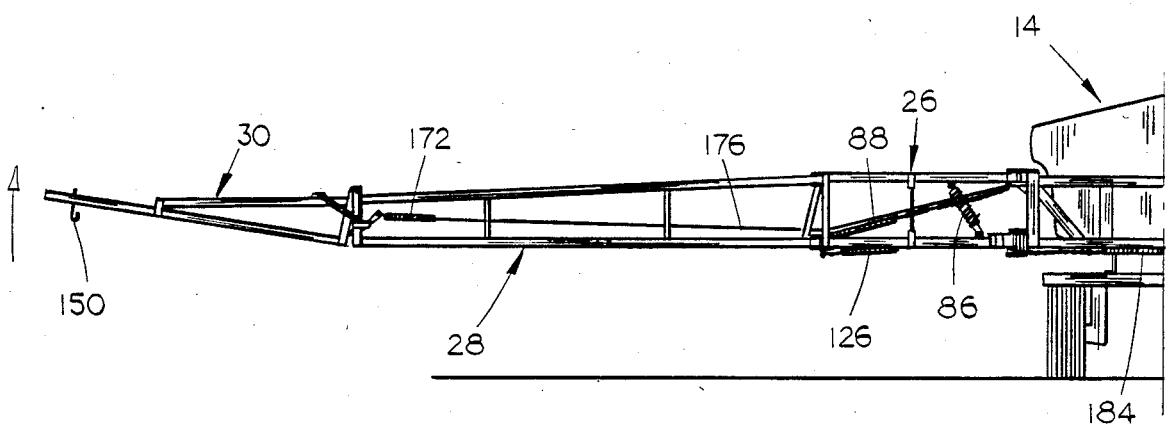
FIG. 9 is a partial rear view of the sprayer illustrating the outer boom section being pivotally moved upwardly.

Inner boom section 24 includes an upper boom arm 32 which has a bracket 34 secured thereto which is pivotally secured to bracket 36 by means of bolt 38. Bracket 36 is secured to the upper end of post 20 by means of bolt 40. A pair of horizontally disposed and vertically spaced plates 42 and 44 are secured to the lower end of the post as seen in FIG. 6. Plates 46 and 48 are clamped onto plates 42 and 44 by means of bolts 50 and 52. Angle support 54 is movably positioned between the plates 46 and 48 and has a pair of chains 56 and 58 connected to the opposite ends thereof by means of cotter keys 60 and 62. Chains 56 and 58 yieldably maintain the support 54 between the plates 46 and 48 but permit the support 54 to essentially pivot either forwardly or rearwardly within plates 46 and 48 if the boom assembly encounters an obstruction. The chains 56 and 58 also function as a centering means to maintain the angle support 54 generally transverse to center frame section 12.

A pair of lower boom arms 64 and 66 form the lower part of inner boom section 26 as best seen in FIG. 6. Bracket 68 is pivotally connected about a horizontal axis to the inner ends of boom arms 64 and 66 by means of bolt 70. Bracket 68 includes a pair of collars 72 and 74 secured thereto which are adapted to be positioned over the openings 76 and 78 in the support 54. Collar 74 is pivotally connected about a vertical axis to support 54 by means of bolt 80 extending through ear 82, collar 74, and opening 78. Collar 72 is also normally secured to the support 54 by means of pin 84 extending downwardly through collar 72 and opening 76. When pin 84 extends through collar 72 and opening 76, rearward pivotal movement of bracket 68, relative to support 54, is prevented. When pin 84 is removed, the boom assembly may be pivotally moved forwardly about bolt 80 for transport purposes.

Spring assisted shock absorber 86 is secured to boom arm 32 and boom arm 66 to normally aid in maintaining boom arms 64 and 66 of inner boom section 24 in the generally horizontal position illustrated in the drawings. A spring chain assembly 88 is also provided to aid in maintaining boom arms 64 and 66 of inner boom section 24 in the generally horizontally disposed position illustrated in FIG. 2 and to aid in centering the inner boom section 24 relative to center frame section 12. Post 90 is pivotally secured to the outer ends of boom arms 32 and 64, 66 by means of bolts 92 and 94. As seen in FIG. 7, the outer end of spring chain assembly 88 is connected to bolt 96 which is secured to post 90. The inner boom section 24 functions as a parallel arm linkage so that post 90 remains in a substantially vertically disposed position whether the outer end of the inner boom section 24 is lowered or raised relative to center frame section 12.

Intermediate boom section 28 is pivotally secured to post 90 as will now be described. Upper boom arm 98 of intermediate boom section 28 is provided with an offset collar 100 which is received between plates 102 and 104 and pivotally secured thereto by means of bolt 106. Lower boom arm 108 of intermediate boom section 28 also has an offset collar 110 secured thereto which is pivotally secured to the plate 112 by means of the bolt 114 which extends downwardly through collar 110 and through opening 116 in angle bracket 118. The outer end of chain 120 extends through slot 122 and angle bracket 118 and is secured thereto by means of cotter key 124. The inner end of chain 120 is secured to spring 126 which is secured to boom arm 68 at 128. Boom arm 108 is also provided with a collar 130 which is normally positioned over opening 132 of angle brakcet 118 and which is adapted to receive pin 134 extending downwardly therethrough. When pin 134 is installed, boom section 28 may only pivotally move rearwardly about bolts 106 and 114 against the resistance of the spring 126. When pin 134 is removed from collar 130, the boom section 28 may freely be pivotally moved relative to post 90 to facilitate the positioning of the boom assembly in the transport position as will be described in more detail hereinafter.

Channel member 136 is secured to the outer ends of boom arms 98 and 108 and is provided with an opening 138 formed therein as seen in the FIG. 7.

Outer boom section 30 comprises a horizontally disposed lower boom arm 142 and an angularly disposed upper boom arm 142 having post 144 secured to the inner ends thereof as seen in FIG. 7. Collar 146 is mounted at the upper inner end of boom arm 142 and is received within the channel 136 at the upper end thereof and secured thereto by means of 148. The outer end of boom arm 140 is provided with a skid member 150 adapted to engage the ground to prevent the outer end of the boom section 30 from digging into the ground. The upper ends of springs 152 and 154 are secured to boom arm 142 by means of bolt 156 and extend downwardly and inwardly therefrom. The lower inner ends of spring 152 and 154 are secured to bolt 158 which is secured to channel member 136 to normally yieldably maintain lower boom arm 140 in a generally horizontally disposed position. Lever 160 is pivotally secured to brackets 162 and 164 by means of bolt 166 extending therethrough and through collar 168 mounted on lever 160. Lever 160 is provided with an outwardly extending finger 170 which is adapted to engage the inner surface of post 144 through opening 138. Spring 172 is connected to the upper end of lever 160 at 174 and has cable 176 extending inwardly from the inner end thereof. Cable 176 extends downwardly from the inner end of spring 172 through a suitable guide on vertical post 178 on intermediate boom section 28. Cable 176 then extends through suitable guides on posts 180 and 90 and thence upwardly to bracket 36 to which it is connected by means of screw 182. The upper ends of chains 184 and 186 of chain spring assembly 88 are also secured to bracket 36 by means of the screw 182.

FIG. 2 is a rear view of the sprayer 10 with the solid lines indicating the normal position of the boom assemblies 24 and 24'. As seen in FIG. 2, the lower boom arms of the boom sections of the sprayer are in a generally horizontally disposed position and conventional spray nozzles would be mounted thereon so that the field or ground may be sprayed. In the normal position, the boom assemblies 24 and 24' extend transversely from the center frame section and are yieldably maintained in that position by the springs 184, 88 and 126. If the vehicle should encounter a bump or the like which tends to move the boom assembly 24 upwardly relative thereto as illustrated in FIG. 2, the lower boom arms of boom sections 28 and 30 remain generally horizontal due to the parallel arm linkage between boom section 26 and boom section 28. The spring assisted shock absorber 86 resists the upward movement of the outer end of inner boom section 26 relative to the center frame section 12. If the vehicle encounters a bump or irregularity which tends to move the outer end of inner boom section 26 downwardly relative thereto as illustrated by broken lines in FIG. 2, the lower boom arms 64 and 68 of boom section 28 remain generally parallel to the ground but the outer end of the outer boom section 30 will move upwardly to prevent the outer end thereof from digging into the ground. The lifting of the outer end of the boom section 30 is caused by the lever 160. As the boom sections 26 and 28 move downwardly relative to pin 182 and center frame section 12, the cable 176 is effectively "shortened" which causes lever 160 to pivotally move about bolt 158 so that finger 170 engages the inner surface of post 144 to pivotally move outer boom section 30 about bolt 148.

If boom section 26 should encounter an obstruction during the forward movement of the sprayer, inner boom section 26 will pivotally move rearwardly inasmuch as support 54 may move between plates 46 and 48 against the resistance of the spring 184. If outer boom section 30 or intermediate boom section 28 should engage an obstruction during the forward movement of the sprayer, the inner end of the intermediate boom section 28 may pivot rearwardly about bolts 106 and 114 against the resistance of the spring 126. If boom section 28 pivotally moves rearwardly relative to boom section 26, the outer end of boom section 30 is also raised through the lever 160 since the length of the cable 176 is "shortened" thereby causing lever 160 to pivotally move about bolt 158.

When it is desired to move the boom assembly 24 to the transport position, pins 84 and 134 are removed. Removal of pin 84 permits boom section 26 to be freely pivotally moved forwardly relative to center frame section 12 about bolt 80 since spring 184 is no longer effectively connected to the bracket 68. Removal of the pin 134 permits the boom section 28 to be folded rearwardly relative to inner boom section 26 as illustrated in FIG. 1. It is also recommended that the boom section 30 be pivotally moved upwardly relative to boom section 28 so that boom section 30 will rest or lay on the upper end of boom section 28 in the transport position as illustrated in FIG. 3.

Thus it can be seen that a novel sprayer has been provided which permits the outer end of the outermost boom sections to move upwardly if the boom sections encounter an obstruction or the like. As previously stated, the outer end of the outer boom section is also moved upwardly in the event that the vehicle should encounter a bump or the like which normally causes the inner boom section to move downwardly relative to the center frame section of the sprayer. The apparatus of this invention also ensures that the sprayer will remain in the operative position during spraying operations but yet permitting the boom assemblies to be easily moved to the transport position as required. Thus it can be seen that the sprayer of this invention accomplishes at least all of its stated objectives.

We claim:

1. A wheeled frame means having rearward and forward ends,
    a center frame section mounted on said wheeled frame means and having upper and lower portions and opposite ends, said frame section being disposed transversely to the direction of travel of said wheeled frame means,
    first and second boom assemblies mounted at the opposite ends of said center frame section and normally extending laterally outwardly therefrom,
    each of said first and second boom assemblies comprising inner, intermediate and outer boom sections,
    each of said inner boom sections comprising an upper boom arm operatively pivotally secured about horizontal and vertical axes to one end of said center frame section and a normally horizontally disposed lower boom arm operatively pivotally secured about horizontal and vertical axes to said one end of said center frame section,
    first resilient means operatively connecting said inner boom section to said center frame section for yieldably resisting the rearward pivotal movement of said inner boom section, relative to said center frame section,
    an upstanding post means pivotally secured about horizontal axes to the outer ends of said upper and lower boom arms of said inner boom section,
    a spring means connected to said inner boom section for yieldably maintaining said lower arm of said inner boom boom section in a generally horizontally disposed position,
    each of said intermediate boom sections including at least an upper boom arm and a normally horizontally disposed lower boom arm and being pivotally connected about a vertical axis to said upstanding post means of said inner boom section,
    a second spring means operatively connected to said intermediate boom section to yieldably maintain said intermediate boom section parallel to said inner boom section but permitting said intermediate boom section to move rearwardly if either of said intermediate or outer boom sections strike an obstruction,
    each of said outer boom sections being pivotally secured about a horizontal axis to the outer end of said intermediate boom section,
    said outer boom section including at least a normally horizontally disposed lower boom arm which is normally generally parallel to said lower boom arm of said intermediate boom section,
    a third spring means connected to said outer boom section to yieldably prevent the upward pivotal movement of said outer boom section relative to said intermediate boom section,
    and actuator means connected to and extending between said outer boom section and said inner boom section whereby the outer end of said outer boom section will be pivotally moved upwardly, relative to said intermedite boom section, and said inner boom section moves downwardly relative to said center frame section.

2. The apparatus of claim 1 wherein said actuator means also causes the outer end of said outer boom section to pivotally move upwardly relative to said intermediate boom section if either said outer or intermediate boom sections strike an obstruction which causes said intermediate boom section to pivotally move rearwardly relative to said inner boom section.

3. The apparatus of claim 1 wherein a releasable connection means is provided between said inner boom section and said center frame section to permit said inner boom section to be freely pivotally moved forwardly to a transport position.

4. The apparatus of claim 3 wherein a releasable connection means is also provided between said inner and intermediate boom sections to permit said intermediate boom section to be freely pivotally moved rearwardly relative to said inner boom section, to a transport position.

5. The apparatus of claim 4 wherein said outer boom section may be folded upwardly over said intermediate section for transport purposes.

* * * * *